United States Patent [19]

Ikeda et al.

[11] Patent Number: 4,803,026
[45] Date of Patent: Feb. 7, 1989

[54] PROCESS FOR PREPARATION OF ACRYLIC RESIN SHEETS HAVING EXCELLENT MOLDABILITY AND SOLVENT RESISTANCE

[75] Inventors: Hiroyuki Ikeda; Yukihiro Matsumoto, both of Toyama; Koyu Nishimura, Yokohama, all of Japan

[73] Assignee: Mitsubishi Rayon Company, Ltd., Tokyo, Japan

[21] Appl. No.: 915,095

[22] Filed: Oct. 3, 1986

[51] Int. Cl.$^4$ .............................................. B29C 39/16
[52] U.S. Cl. .................... 264/216; 264/236; 264/231.18; 264/331.21; 264/347; 425/224
[58] Field of Search ........... 264/347, 216, 236, 331.18, 264/331.21; 425/224

[56] References Cited

U.S. PATENT DOCUMENTS

| | | | |
|---|---|---|---|
| 2,136,423 | 11/1938 | Fields et al. | 264/327 |
| 2,168,331 | 8/1939 | Fields et al. | 264/327 |
| 3,371,383 | 3/1968 | Hellsund | 425/224 |
| 3,383,448 | 5/1968 | Bader et al. | 264/171 |
| 3,736,090 | 5/1973 | Adey et al. | 425/224 |
| 3,966,693 | 6/1976 | Kato | 264/331.18 |
| 4,089,918 | 5/1978 | Kato et al. | 264/166 |
| 4,183,991 | 1/1980 | Smiley et al. | 264/331.18 |
| 4,415,509 | 11/1983 | Toyooka et al. | 264/331.18 |

FOREIGN PATENT DOCUMENTS

| | | | |
|---|---|---|---|
| 2801221 | 7/1979 | Fed. Rep. of Germany | 264/331.18 |
| 48-16713 | 5/1973 | Japan | 264/331.18 |

Primary Examiner—Jeffery Thurlow
Attorney, Agent, or Firm—Kenyon & Kenyon

[57] ABSTRACT

Acrylic resin sheets having an excellent heat moldability and solvent resistance are prepared by:

(1) preparing a syrup of methyl methacrylate or a monomer mixture comprising at least 60 weight % of methyl methacrylate and not more than 40 weight % of an acrylic acid ester by partially polymerizing the monomer or monomers in the presence of 0.01 to 2.0 weight %, based on the monomer or monomers, of a chain transfer agent, as well as a polymerization initiator; and (2) incorporating the thus-prepared syrup with 0.02 to 1.0 weight %, based on the syrup, of a cross-linking agent, and subjecting the resulting mixture of cast polymerization under such conditions that if the crosslinking agent is not present, the intrinsic viscosity of the completely polymerized sheet is in the range of 0.05 to 0.12 l/g.

6 Claims, 4 Drawing Sheets

PROCESS FOR PREPARATION OF ACRYLIC RESIN SHEETS HAVING EXCELLENT MOLDABILITY AND SOLVENT RESISTANCE

BACKGROUND OF THE INVENTION (1) Field of the Invention

The present invention relates to a process for the preparation of acrylic resin sheets having excellent heat moldability and solvent resistance.

(2) Description of the Related Art

Acrylic resin sheets are widely used in various fields because they have excellent transparency, gloss, surface hardness, mechanical strength, and heat resistance. However, conventional acrylic resin sheets have problems such that when placed in contact with an organic solvent such as ethanol or a paint thinner after heat molding, or subjected to FRP back-up processing with a polyester resin, crazing or cracking occurs and the usual excellent appearance thereof, a merit of acrylic resins, is degraded.

When a complicated molded article having a large elongation is prepared by vacuum-molding or compression-molding an acrylic resin sheet at a high temperature, the molding is limited by the flow characteristics of the molten polymer. For example, when preparing a molded article having corners and a concave face, a molded article having a drastically reduced sheet thickness at the corners (molded article having a nonuniform thickness) is obtained.

As a means for solving the former problem of cracking or crazing by a solvent, there is a method in which a polymer having a high molecular weight is used. But, if the molecular weight is high, the melt viscosity is also high, and thus the molding process becomes difficult.

As a means for solving the problem of poor moldability, there is a method in which a polymer having a low molecular weight is used, but if this method is adopted, the solvent resistance is degraded.

A complicated molded article can be obtained by heating a sheet at a high temperature, but according to this method, a molded article having a uniform thickness cannot be obtained and foaming or discoloration, sometimes appear in the sheet.

Accordingly, as apparent from the foregoing description, an acrylic resin sheet having an excellent moldability and solvent resistance has not been obtained by the prior art.

SUMMARY OF THE INVENTION

Under the above-mentioned background, it is an object of the present invention to provide a process for preparing an acrylic resin sheet having an excellent moldability and solvent resistance.

Therefore, in accordance with the present invention, there is provided a process for the preparation of acrylic resin sheets having an excellent heat moldability and solvent resistance, wherein a syrup is prepared, which is composed of a partial polymerization product of methyl methacrylate or a monomer mixture comprising at least 60% by weight of methyl methacrylate and not more than 40% by weight of an acrylic acid ester, by partially polymerizing methyl methacrylate or said monomer mixture in the presence of a polymerization initiator; the thus-prepared syrup is incorporated with 0.02 to 1.0% by weight, based on the weight of the syrup, of a crosslinking agent; and the resulting mixture is subjected to cast polymerization in a casting mold. This process is characterized in that the partial polymerization of the methyl methacrylate or said monomer mixture for the preparation of the syrup is carried out in the co-presence of 0.01 to 2.0% by weight, based on the weight of the methyl methacrylate or said monomer mixture, of a chain transfer agent, and further in that the cast polymerization is carried out under such conditions that if the crosslinking agent is not present, the intrinsic viscosity of the completely polymerized sheet is in the range of 0.05 to 0.12 /lg.

DESCRIPTION OF THE PREFERRED EMBODIMENTS

Figure 1:
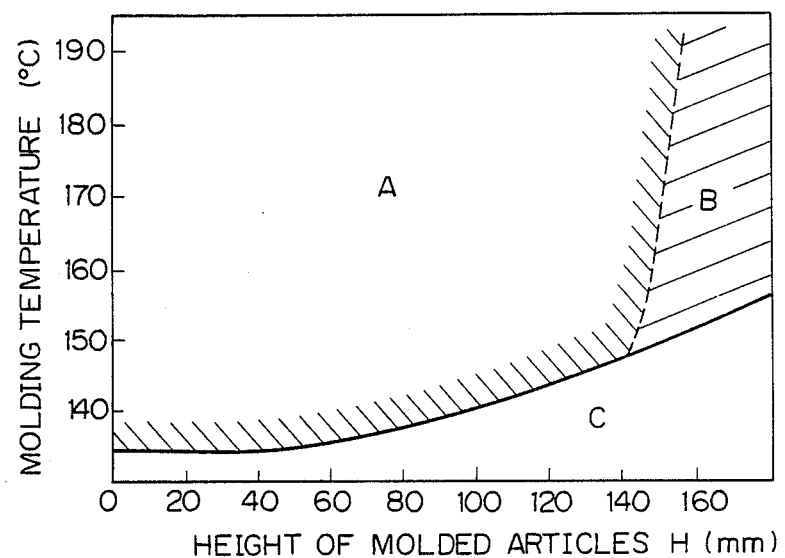
FIGS. 1 through 4 are diagrams illustrating the crack formation observed when a molded article is subjected to FRP back-up processing.

The process for preparing acrylic resin sheets according to the present invention comprises, as the main steps, the step of preparing a syrup, i.e., a partial polymerization product of methyl methacrylate or its monomer mixture, and the step of forming a sheet by cast-polymerizing the syrup.

At the step of preparing the syrup, methyl methacrylate or a monomer mixture comprising at least 60% by weight of methyl methacrylate and not more than 40% by weight of an acrylic acid ester is polymerized in the presence of a chain transfer agent and a polymerization initiator.

As the acrylic acid ester to be copolymerized with methyl methacrylate at the syrup-preparing step, there can be mentioned methyl acrylate, ethyl acrylate, n-butyl acrylate, and 2-ethylhexyl acrylate.

The amount of acrylic acid ester used is up to 40% by weight. If the amount of acrylic acid ester is larger than 40% by weight, the heat resistance is degraded.

As the chain transfer agent, there can be mentioned alkyl mercaptans such as t-butyl mercaptan, n-octyl mercaptan, n-dodecyl mercaptan, and t-dodecyl mercaptan; aromatic mercaptans such as thiophenol and thionaphthol; thioglycolic acid and thioglycolic acid esters such as ethyl thioglycolate, butyl thioglycolate, octyl thioglycolate, methoxybutyl thioglycolate, ethoxyethyl thioglycolate, butoxyethyl thioglycolate, phenoxyethyl thioglycolate, trimethylolpropane trithioglycolate, pentaerythritol tetrathioglycolate, and methylene-bisbutyl thioglycolate; and $\beta$-mercaptopropionic acid and $\beta$-mercaptopropionic acid esters such as methyl $\beta$-mercaptopropionate, octyl $\beta$-mercaptopropionate, methoxybutyl $\beta$-mercaptopropionate, trimethylolpropane tris-$\beta$-mercaptopropionate, and pentaerythritol tetrathiopropionate. These chain transfer agents may be used singly or in the form of mixtures of two or more thereof.

The amount of the chain transfer agent incorporated varies according to the particular chain transfer agent, but the amount of the chain transfer agent should not be outside the range of from 0.01 to 2.0% by weight, preferably 0.01 to 0.70% by weight, based on the weight of the monomer or monomers. If the amount of the chain transfer agent is smaller than 0.01% by weight, the polymerization degree of the polymer is too high and the molding processing at a high draw ratio becomes difficult. If the amount of the chain transfer agent is larger than 2.0% by weight, the molecular weight is reduced, the mechanical strength is degraded, and the rate of polymerization is drastically reduced. In view of the rate of polymerization, a chain transfer agent having a large chain transfer constant (in the case of alkyl mercaptans, n-alkyl mercaptans rather than t-alkyl mercaptans) is preferred because satisfactory effects can be thus attained with a smaller amount of the chain transfer agent.

As the polymerization initiator used in the process of the present invention, there can be mentioned peroxides such as lauroyl peroxide, benzoyl peroxide, di-isopropyl peroxydicarbonate and di-n-butyl peroxydicarbonate; and azo compounds such as 2,2'-azobis(isobutyronitrile), 2,2'-azobis(2,4-dimethylvaleronitrile), 1,1'-azobis(cyclohexane-1-carbonitrile), and azobis(2,4-dimethyl-4-methoxyvaleronitrile). These polymerization initiators may be used singly or in the form of mixtures of two or more thereof. The amount of the polymerization initiator is 0.001 to 0.50% by weight based on the weight of the monomer or monomers.

The polymerization for preparing the syrup is performed by heating a mixture of the above-mentioned monomer, chain transfer agent, and polymerization initiator at a temperature of 70° to 120° C. until the conversion reaches a value of 5 to 50%. A known tube or tank reactor may be used as the reaction vessel for the preparation of the syrup. The polymerization can be carried out batchwise or in a continuous manner.

At the step of preparing a sheet by cast polymerization, a crosslinking agent and a polymerization initiator are added to the syrup obtained at the above-mentioned step and the syrup is polymerized in a casting mold. The cast polymerization is preferably carried out under conditions such that, if the crosslinking agent is not present, a resin sheet having an intrinsic viscosity of 0.05 to 0.12 l/g is obtained. If the cast polymerization is carried out under conditions such that the above-mentioned intrinsic viscosity is smaller than 0.05 l/g, the mechanical strength of the obtained sheet is low and, hence, the solvent resistance is degraded. If the cast polymerization is carried out under conditions such that the above-mentioned intrinsic viscosity is larger than 0.12 l/g, the molding processing of the sheet becomes difficult.

The polymerization conditions wherein, if the crosslinking agent is not present, the intrinsic viscosity of the completely polymerized sheet is 0.05 to 0.12 l/g, which are adopted at the sheet-preparing step of the present invention, vary depending upon the kind of monomer used for formation of the sheet, the kind and amount of chain transfer agent, the kind and amount of polymerization initiator, and the polymerization temperature, and cannot be simply specified. However, these conditions can be easily determined by a cast polymerization test of a blank syrup free of the crosslinking agent.

The intrinsic viscosity of the sheet referred to in the present invention is a value obtained by dissolving the sample in chloroform to form a solution having a concentration of 0.1% by weight, maintaining the solution at 25° C., measuring a flow-down time t (seconds) of the solution between indicator lines and a flow-down time $t_0$ (seconds) of chloroform by an Ostwald viscometer, and calculating the intrinsic viscosity according to the following formula:

$$[\eta] = \frac{3\left\{\left(\frac{t}{t_0}\right)^{1/3} - 1\right\}}{C}$$

wherein C stands for the sample concentration (g/l).

As the crosslinking agent used at the cast polymerization step of the process of the present invention, there can be mentioned glycol dimethacrylates such as ethylene glycol dimethacrylate, diethylene glycol dimethacrylate, triethylene glycol dimethacrylate, tetraethylene glycol dimethacrylate, 1,3-butylene glycol dimethacrylate, polyethylene glycol dimethacrylate, propylene glycol dimethacrylate, dipropylene glycol dimethacrylate, and neopentul glycol dimethacrylate; glycol diacrylates such as ethylene glycol diacrylate, diethylene glycol diacrylate, triethylene glycol diacrylate, tetraethylene glycol diacrylate, 1,3-butylene glycol diacrylate, polyethylene glycol diacrylate, propylene glycol diacrylate, dipropylene glycol diacrylate, and neopentyl glycol diacrylate; diol dimethacrylates such as 1,3-propane-diol dimethacrylate, 1,4-butane-diol dimethacrylate, and 1,6-hexane-diol dimethacrylate; diol diacrylates such as 1,3-propanediol diacrylate, 1,4-butane-diol diacrylate, and 1,6-hexane-diol diacrylate; methacrylates having at least three functional groups such as trimethylolpropane trimethacrylate, pentaglycerol trimethacrylate, and pentaerythritol tetramethacrylate; acrylates having at least three functional groups such as trimethylolpropane triacrylate, pentaglycerol triacrylate, and pentaerythritol tetraacrylate; and allyl methacrylate, allyl acrylate, diallyl maleate, vinyl methacrylate, and divinylbenzene. These crosslinking agents may be used singly or in the form of mixture of two or more thereof.

The amount of the crosslinking agent is 0.02 to 1.0% by weight based on the syrup used. If the amount of the crosslinking agent used is smaller than 0.02% by weight, a molded article having a good uniform thickness is difficult to obtain. If the amount of the crosslinking agent is larger than 1.0% by weight, molding at a high draw ratio becomes difficult because the sheet is rigid.

A polymerization initiator as mentioned above with respect to formation of the syrup can be used for the cast polymerization. The amount of the crosslinking agent used is 0.01 to 0.50% by weight based on the syrup.

As the casting mold, there can be mentioned a casting mold comprising plate members such as reinforced glass sheets, chromium-deposited plates or stainless steel plates, and soft polyvinyl chloride resin gaskets, and a casting mold comprising a pair of endless belts having confronting surfaces running in the same direction at the same speed and continuous gaskets running in both side portions of the confronting surfaces at the same speed as that of the endless belts.

The cast polymerization is carried out at 40° to 90° C. for 0.2 to 10 hours and then at 90° to 150° C. for 0.05 to 4 hours.

The thickness of the resin sheet obtained according to the preparation process of the present invention is 1 to 20 mm. In the process of the present invention, additives such as a colorant, a plasticizer, a lubricant, a parting agent, a stabilizer, and a filler may be added according to need.

The present invention will now be described in detail with reference to the following examples. In the examples, the properties were evaluated according to the following methods.

(1) Heat Moldability (A) Measurement of Bending Radius (R) of Corner Portion of Molded Article A sheet 300 mm×300 mm was heated by an infrared ray heater so that the temperature of both surfaces thereof was elevated to a predetermined level, and vacuum molding was carried out by using a cylindrical mold having a diameter of 220 mm and a height of 140 mm. The bending radius (R) of the corner portion of the molded article was measured.

(B) Molding Region

A sheet 300 mm×300 mm was heated by an infrared ray heater so that the temperature of both surfaces thereof was elevated to a predetermined level, and vacuum molding was carried out by using a mold having a diameter D of 220 mm to obtain molded articles having a height H of 120 to 240 mm. The relationship between the H/D ratio of the molded articles and the molding temperature was measured and the sheet-molding region was determined.

(2) Elongation (%)

A dumbbell having a parallel portion 3.7 mm in width and a parallel portion 10 mm in length was prepared from a sheet, and the specimen was pre-heated at 80° C. for more than 40 hours. The clamping distance was set at 25 mm and the specimen was allowed to stand in an atmosphere maintained at a predetermined temperature, and was drawn by a tensile tester (supplied by Toyo-Baldwin) until the sheet was broken. The elongation (%) at break was determined.

(3) Solvent Resistance (A) Measurement of Breaking Time

A sheet 300 mm×300 mm was pre-dried at 80° C. for more than 40 hours and then heated in a furnace at 170° C. for 20 minutes. The sheet was then molded at an ejection height H of 30, 50 or 70 mm by an ejector molding machine provided with a cylindrical mold having a diameter of 170 mm, in which the height was optionally adjustable.

A sample 40 mm×25 mm was collected from the upper bottom portion of the molded article. Styrene as a solvent was dropped onto the sample, to which a stress of 140 kg/cm$^2$ was applied, and the breaking time of the sample was measured.

(B) State of Formation of Cracks at FRP Back-Up Processing

A sheet 300 mm×300 mm was heated by an infrared ray heater so that the temperature of both surfaces thereof was elevated to a predetermined level, and vacuum molding was carried out in the molding region determined by the above-mentioned method (B) by using a cylindrical mold.

Two chopped strand mats of glass fiber were placed on the upper bottom face and the side face, and 250 g of a composition formed by adding 1 part of Permeck N (supplied by Nippon Oil and Fats Co. and containing 55% of methyl ethyl ketone) to 100 parts of an unsaturated polyester resin (Ester R-235B-1 supplied by Mitsui-Toatsu Chem.) was uniformly coated by a roll. This operation was conducted 4 times as a whole and 8 glass fiber mats were backed up to the molded article by using 1 kg of the composition. Cracking of the sheet at the time of curing was checked to determine the crack-forming region. The above-mentioned composition was gelled within 30 minutes and cured in 1 hour.

EXAMPLE 1

To a monomer mixture comprising 96.5 kg of methyl methacrylate and 3.5 kg of 2-ethylhexyl acrylate were added 100 g of 2,2'-azobis(2,4-dimethylvaleronitrile) and 80 g of n-dodecyl mercaptan, and the mixture was charged into a tank type polymerization vessel and heated at a temperature higher than 90° C. for 20 minutes, and the reaction mixture was cooled to room temperature to obtain a syrup having a polymer concentration of 28%.

To 10 kg of the syrup were added 8.0 g of 2,2'-azobis(2,4-dimethylvaleronitrile), 15 g of ethylene glycol dimethacrylate as the crosslinking agent, 0.5 g of Aerosol TO (supplied by A.C.C.) as the parting agent and 2.0 g of Tinuvin-P (supplied by Ciba-Geigy) as the stabilizer, and the mixture was deaerated under a reduced pressure.

The deaerated syrup was cast into a casting mold comprising reinforced glass sheets and soft polyvinyl chloride gaskets and polymerization was effected in a water bath maintained at 70° C. for 40 minutes and then in hot air at 120° C. for 2 hours to obtain a sheet having a thickness of 3 mm. Note, the intrinsic viscosity of the sheet obtained under the same conditions as described above, except that the crosslinking agent was not added, was 0.11 /g.

EXAMPLE 2

To 1,000 kg of methyl methacrylate were added 1,000 g of 2,2'-azobis(2,4-dimethylvaleronitrile) and 2,000 g of n-dodecylmercaptan, and the mixture was charged into a polymerization vessel, heated at a temperature higher than 90° C. for 20 minutes and cooled to room temperature to obtain a syrup having a polymer concentration of 27%.

To 1,000 kg of the syrup were added 900 g of 2,2'-azobis(2,4-dimethylvaleronitrile), 2,300 g of 1,3-butylene glycol dimethacrylate as the crosslinking agent, 50 g of Aerosol OT as the parting agent and 200 g of Tinuvin-P as the stabilizer, and the mixture was deaerated under a reduced pressure. The deaerated syrup was cast into a casting mold of a continuous sheet-preparing apparatus comprising two stainless steel endless belts running in the confronting state with a belt clearance set at 3.6 to 3.1 mm and gaskets, and the syrup was heat-polymerized at 70° C. for 50 minutes and then at 120° C. for 5 minutes to obtain a sheet having a thickness of 3 mm. Note, the intrinsic viscosity of the sheet prepared under the same polymerization conditions as described above, except that the crosslinking agent was not added to the syrup, was 0.07 l/g.

COMPARATIVE EXAMPLE 1

To 100 kg of methyl methacrylate was added 65 g of 2,2'-azobis(2,4-dimethylvaleronitrile), and the mixture was charged in the same polymerization vessel as used in Example 1, heated at a temperature higher than 90° C. for 10 minutes and cooled to room temperature to obtain a syrup having a polymer concentration of 23%.

To 10 kg of the syrup were added 8.0 g of 2,2'-azobis(2,4-dimethylvaleronitrile), 0.5 g of Aerosol OT as the parting agent and 2.0 g of Tinuvin-P as the stabilizer, and the mixture was deaerated under a reduced pressure. The deaerated syrup was cast into a casting mold comprising reinforced glass sheets and soft polyvinyl chloride resin gaskets and polymerized in a water bath maintained at 70° C. for 40 minutes and then in hot air at 120° C. for 2 hours to obtain a sheet having a thickness of 3 mm. Note, the intrinsic viscosity of the obtained sheet was 0.23 l/g.

COMPARATIVE EXAMPLE 2

To 10 kg of a syrup having a polymer concentration of 23%, which was prepared under the same conditions as described in Comparative Example 1, 8.0 g of 2,2'-azobis(2,4-dimethyl-valeronitrile), 20 g of ethylene glycol dimethacrylate as the crosslinking agent, 0.5 g of Aerosol OT as the parting agent and 2.0 g of Tinuvin-P as the stabilizer were added, and the mixture was deaerated under a reduced pressure. The deaerated syrup was cast-polymerized under the same polymerization conditions as described in Example 1, whereby a sheet having a thickness of 3 mm was obtained.

COMPARATIVE EXAMPLE 3

To a mixture comprising 96.5 kg of methyl methacrylate and 3.5 kg of 2-ethylhexyl acrylate were added 100 g of 2,2'-azobis(2,4-dimethylvaleronitrile) and 80 g of n-dodecyl mercaptan, and the mixture was charged in the same polymerization vessel as described in Example 1, heated at a temperature higher than 90° C. for 20 minutes and cooled to room temperature to obtain a syrup having a polymer concentration of 28%.

To 10 kg of the syrup were added 8.0 g of 2,2'-azobis(2,4-dimethylvaleronitrile, 0.5 g of Aerosol OT as the parting agent and 2.0 g of Tinuvin-P as the stabilizer, and the mixture was deaerated under a reduced pressure. The deaerated syrup was cast-polymerized under the same polymerization conditions as described in Example 1, whereby a sheet having a thickness of 3 mm was obtained. Note, the intrinsic viscosity of the obtained sheet was 0.11 l/g.

The physical properties of the sheets obtained in the foregoing examples and comparative examples were evaluated.

Figure 2:
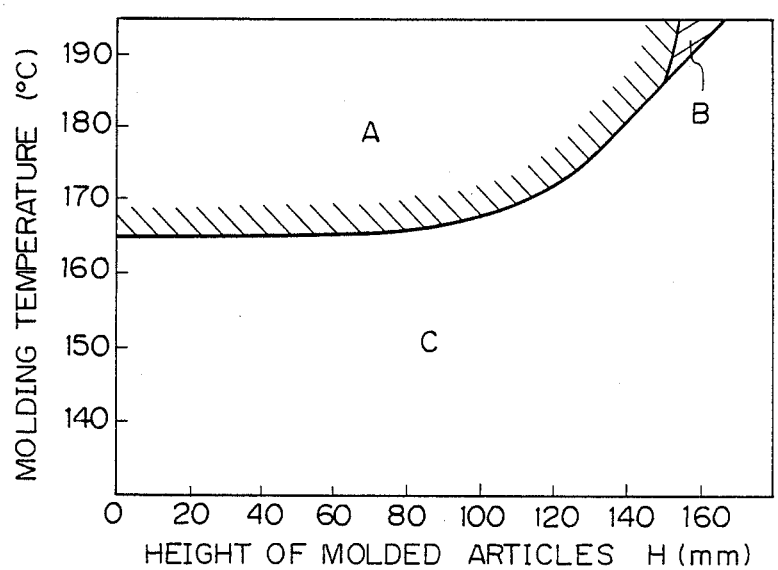
Figure 3:
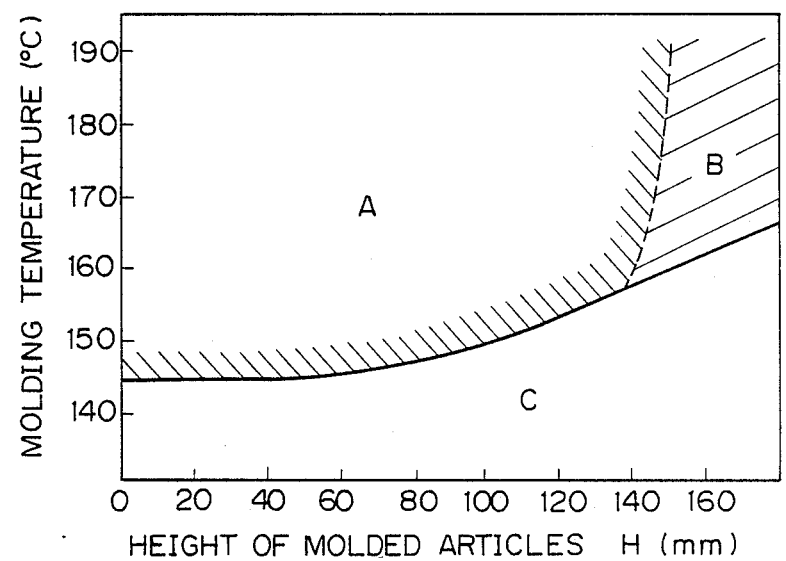
Figure 4:
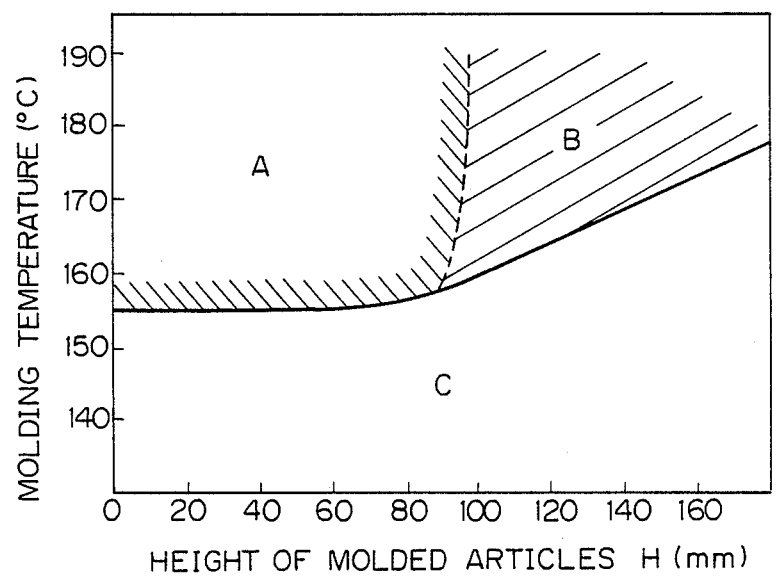

The results are shown in Tables 1 and 2 and FIGS. 1 through 4. FIGS. 1 through 4 correspond to Example 1, Comparative Example 1, Example 2, and Comparative Example 2, respectively. In these figures, A is a region where cracks are not formed, B is a region where cracks are formed, and C is a region where molding is impossible.

TABLE 1

| Physical properties | Testing conditions | Example 1 | Example 2 | Comparative Example 1 | Comparative Example 2 | Comparative Example 3 |
|---|---|---|---|---|---|---|
| Bending radius (R) (mm) | 140° C. | Impossible to mold | 60 | Impossible to mold | Immpossible to mold | 71 |
| | 160° C. | 63 | 40 | Impossible to mold | Impossible to mold | 33 |
| | 180° C. | 30 | 27 | 46 | 72 | 16 |
| | 200° C. | 17 | 19 | 23 | 55 | 8 |
| | 220° C. | 12 | 14 | (13) | 44 | Foamed at ≧ 205° C. |
| | 240° C. | 10 | Foamed at ≧ 230° C. | Foamed at ≧ 220° C. | 36 | — |
| | 260° C. | (10) Foamed at ≧ 260° C. | — | — | (30) Foamed at ≧ 260° C. | — |
| Maximum H/D | 140° C. | Impossible to mold | 0.55 | Impossible to mold | Impossible to mold | — |
| | 160° C. | 0.65 | 0.9 | Impossible to mold | Impossible to mold | — |
| | 180° C. | 0.95 | 1.1 | 0.9 | 0.6 | — |
| | 200° C. | 1.1 | 1.1 | 1.0 | 0.8 | — |
| | 220° C. | 1.1 | 1.1 | (0.9) | 0.9 | — |
| | 240° C. | 1.1 | Foamed at ≧ 230° C. | Foamed at ≧ 220° C. | 0.95 | — |
| | 260° C. | (1.1) Foamed at ≧ 260° C. | — | — | (1.0) Foamed at ≧ 260° C. | — |
| Elongation (%) | 120° C. | $0.8 \times 10^3$ | $0.7 \times 10^3$ | $0.7 \times 10^3$ | $0.4 \times 10^3$ | $0.5 \times 10^3$ |
| | 130° C. | $1.2 \times 10^3$ | $1.1 \times 10^3$ | $1.3 \times 10^3$ | $0.8 \times 10^3$ | $1.6 \times 10^3$ |
| | 140° C. | $1.4 \times 10^3$ | $1.3 \times 10^3$ | $1.1 \times 10^3$ | $0.9 \times 10^3$ | $4.5 \times 10^3$ |
| | 150° C. | $1.5 \times 10^3$ | $1.4 \times 10^3$ | $1.1 \times 10^3$ | $0.9 \times 10^3$ | $2.2 \times 10^3$ |
| | 160° C. | $1.5 \times 10^3$ | $1.4 \times 10^3$ | $3.7 \times 10^3$ | $0.8 \times 10^3$ | $1.4 \times 10^3$ |
| | 170° C. | $1.5 \times 10^3$ | $1.4 \times 10^3$ | $1.6 \times 10^3$ | $0.8 \times 10^3$ | $1.0 \times 10^3$ |
| | 180° C. | $1.5 \times 10^3$ | $1.3 \times 10^3$ | $1.0 \times 10^3$ | $0.7 \times 10^3$ | $0.7 \times 10^3$ |
| Breaking time (min) | H = 30 mm | 34 | 32 | 7 | 27 | 5 |
| | H = 50 mm | 38 | 36 | 12 | 40 | 9 |
| | H = 70 mm | 50 | 47 | 15 | 50 | 11 |

TABLE 2

| | Molding conditions | | Example 1 | Example 2 | Comparative Example 1 | Comparative Example 2 |
|---|---|---|---|---|---|---|
| | Temperature | Height H mm | | | | |
| Formation of cracks at FRP back-up | 160° C. | 100 | A | A | B | C |
| | | 120 | A | A | C | C |
| | | 140 | A | A | C | C |
| | | 160 | C | B | C | C |
| | 180 | 100 | A | A | B | A |
| | | 120 | A | A | B | A |

TABLE 2-continued

| Molding conditions | | Example 1 | Example 2 | Comparative Example 1 | Comparative Example 2 |
|---|---|---|---|---|---|
| Temperature | Height H mm | | | | |
| processing | 140 | A | A | B | A |
| | 160 | B | B | B | C |
| 200 | 100 | A | A | A | A |
| | 120 | A | A | B | A |
| | 140 | A | A | B | A |
| | 160 | B | B | B | B |
| 220 | 100 | A | A | Foamed | A |
| | 120 | A | A | Foamed | A |
| | 140 | A | A | Foamed | A |
| | 160 | B | A | Foamed | B |

A: Cracks not formed
B: Cracks formed
C: Impossible to mold

We claim:

1. An improvement in a process for the preparation of acrylic resin sheets having excellent heat moldability and solvent resistance, wherein a syrup is prepared, which is composed of a partial polymerization product of methyl methacrylate or a monomer mixture comprising at least 60% by weight of methyl methacrylate and not more than 40% by weight of an acrylic acid ester, by partially polymerizing methyl methacrylate or said monomer mixture in the presence of a polymerization initiator; the thus-prepared syrup is incorporated with 0.02 to 1.0% by weight, based on the weight of the syrup, of a crosslinking agent; and the resulting mixture is subjected to cast polymerization in a casting mold; the improvement comprising carrying out the partial polymerization of the methyl methacrylate or said monomer mixture for the preparation of the syrup in the co-presence of 0.01 to 2.0% by weight, based on the weight of the methyl methacrylate or said monomer mixture, of a chain transfer agent, and carrying out the cast polymerization under such conditions that if the crosslinking agent is not present, the intrinsic viscosity of the completely polymerized sheet is in the range of 0.05 to 0.12 l/g.

2. The process according to claim 1, wherein the chain transfer agent is at least one compound selected from the group consisting of alkyl mercaptans, aromatic mercaptans, thioglycolic acid, thioglycolic acid esters, $\beta$-mercaptopropionic acid and $\beta$-mercaptopropionic acid esters.

3. The process according to claim 1, wherein the crosslinking agent is at least one compound selected from the group consisting of diol dimethacrylates, diol diacrylates, methacrylates having at least three functional groups, acrylates having at least three functional groups, allyl methacrylate, allyl acrylate, diallyl maleate, vinyl methacrylate and divinylbenzene.

4. The process according to claim 1, wherein the chain transfer agent is incorporated in an amount of 0.01 to 0.70% by weight based on the weight of the methyl methacrylate or said monomer mixture, and the chain transfer agent is selected from the group consisting of n-alkyl mercaptans.

5. The process according to claim 1, wherein the casting mold is made of two plates and gaskets.

6. The process according to claim 1, wherein the casting mold comprises a pair of confronting endless belts having confronting surfaces running in the same direction at the same speed, and continuous gaskets running in both side portions of the confronting surfaces at the same speed as that of the endless belts.

* * * * *